No. 821,555. PATENTED MAY 22, 1906
C. H. J. VAN HAEFTEN.
PROCESS OF PRODUCING MANURE FROM PEAT.
APPLICATION FILED APR. 29, 1905.
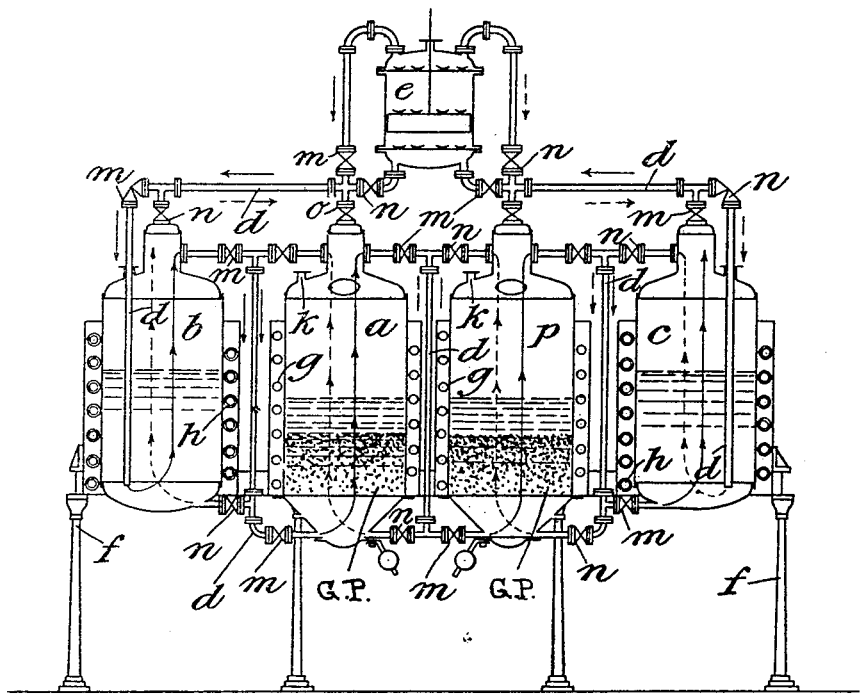
Witnesses
Chas. F. Clagett
N. H. Berrigan
Inventor.
CORNELIS H. J. VAN HAEFTEN.
By his Attorney

UNITED STATES PATENT OFFICE.

CORNELIS HENDRIK JOHAN VAN HAEFTEN, OF THE HAGUE, NETHERLANDS.

PROCESS OF PRODUCING MANURE FROM PEAT.

No. 821,555. Specification of Letters Patent. Patented May 22, 1906.

Application filed April 29, 1905. Serial No. 258,116.

*To all whom it may concern:*

Be it known that I, CORNELIS HENDRIK JOHAN VAN HAEFTEN, a subject of the Queen of the Netherlands, residing at Oude Scheveningscheweg 5, The Hague, Netherlands, have invented a new and useful Process of Producing Manure from Peat; and I do hereby declare the following to be a full, clear, and exact description of the same.

This invention relates to the treatment of peat, especially for the production of a manure, and has for its object the rapid and economical treatment of peat.

I aim to bring into solution all parts of humus and other ingredients present in peat and soluble in water, including combinations of nitrogen, potash, and phosphorus, which are of great value for the nutrition of plants.

It is well known that water when used alone acts slowly upon the humus constituents in the peat, and in order to hasten the action of the water I mix ammonia therewith. As a result the humus constituents are dissolved as well as other ingredients soluble in ammonia, but insoluble in water. By the employment of ammonia-gas the valuable manure materials are quickly extracted from the peat and in a highly-concentrated condition.

My present invention also includes the reuse of the ammonia.

While I may use any suitable apparatus for treating peat according to my invention, in order to make its soluble ingredients more free the apparatus preferred and illustrated in the accompanying drawing is somewhat like a diffusion-battery and comprises a plurality of closed vessels connected together for lixiviation of peat with water containing ammonia. Such preferred apparatus is more fully described and is claimed in a companion application, Serial No. 258,115, filed April 29, 1905, for Letters Patent of the United States.

In practicing my new process the ammonia is liberated in the form of gas from a solution and flowing through the apparatus is dissolved in or admixed with water. Two reservoirs may be provided, one containing the solution of ammonia and the second reservoir containing water. The reservoirs (either or both) may be cooled or heated, as required. An air-pump with its pipe connections serves to create a circulation of air from the water-reservoir, through the ammonia-reservoir, and through the battery. The moving air carries ammonia with it and part remains in the vessels. The main quantity is, however, taken up by the water in the reservoir, which may be maintained at a low temperature. If after a given time it is found that the ammonia has all passed over into the water or the latter is saturated with ammonia, the ammonia may be reconducted to the proper reservoir. It is obvious, therefore, that the ammonia may be continuously circulated or reused, as desired, without loss.

In carrying out my new process in the manner preferred by me ground peat (G P in the drawing) mixed with water is filled into one or more vessels (two vessels $a$ and $p$ are shown for this purpose in the drawing) to any extent desired. The peat will preferably and previous to being placed in the vessels be washed with dilute muriatic acid for the purpose of dissolving lime and then washed with water to remove the traces of the muriatic acid. The practice of the method will also be facilitated by the employment of two reservoirs, one, $b$, containing ammonia in solution and the other, $c$, containing water, and the reservoirs and vessels are arranged so that circulating air will first pass through the ammonia solution, then through the mixture of water and ground peat, and then through water in the separate reservoir.

Heat may be employed to facilitate the treatment of the peat, especially for the purpose of freeing the ammonia.

In the accompanying drawing I have shown an advantageous form of apparatus which may be employed in carrying out my new process.

The apparatus comprises vessels $a$ and $p$, the number of which may be increased as desired, and the reservoirs $b$ and $c$. These four vessels are shown mounted upon a suitable frame supported by pillars or uprights $f$. Pipe connections reach to the bottom of the several vessels, and, as shown in drawing, pipes also connect said reservoirs together in series and with an air-pump $e$. The vessels, especially $a$ and $p$, may be surrounded with jackets $g$, and coiled pipes or other cooling or heated devices connected with suitable supply means are fitted between the jackets and the exterior of the affected vessel. The vessels $a$ and $p$ are provided with all necessary accessories, such as filling-ports, discharge-doors, manometer, thermometer, sight-glasses, manholes, &c. I have shown the vessels also provided with ports $k$ to permit the introduction of an aerometer to measure the density of the solution. The density may also be measured by drawing a small part of the solution through a suitable discharge-cock.

Ammonia solution is filled into the reservoir $b$, and clean water is filled into the reservoir $c$. The reservoir $b$ may be heated and the reservoir $c$ may be cooled.

Assuming that the cocks $m$ are opened and the cocks $n$ and $o$ are closed, the pump $e$ is set at work. The air will then circulate, as indicated by solid arrows, through the pipe $d$ upwardly through the ammonia solution, thence upwardly through the peat and water in vessel $a$, thence upwardly through the peat and water in vessel $p$, and finally upwardly through the water in reservoir $c$, back to the pump $e$. The cited action of the pump causes rarefication of air in reservoir $c$ and increased pressure in reservoir $b$. Ammonia-gas liberated in the reservoir $b$ (owing to the heating by the surrounding coil) is carried to the circulating air and passing through the peat and water mixtures in vessels $a$ and $p$ causes solution of the soluble peat ingredients. A part of the ammonia-gas mixes, of course, with the liquids in the vessels $a$ and $p$, but the remainder passes over into the water in vessel $c$, where it passes into solution. When all of the ammonia-gas is extracted from $b$ and taken up by the liquids in the vessels $a$ and $p$ and in the reservoir $c$, the ammonia may be separated from such liquids in any suitable manner by agitation, blowing, or otherwise. The result sought may be easily and quickly effected with the apparatus illustrated by reversing the circulation through the apparatus in the direction indicated by the dotted arrows. For this purpose the tops of the vessels $a$ and $p$ may be connected directly with the bottom of the air-pump by locking other connections and opening successively the cocks $o$ and the cocks $m$ and $n$, as well as the cocks which connect the pump with the pipe $d$, extending downwardly into the reservoir $c$, and the cock $n$, which opens from the top of the reservoir $b$. A circulation of the air, as indicated by the dotted arrows, will therefore bring the ammonia back to the reservoir $b$. During this operation the vessels $a$ and $p$ may be heated to facilitate the exhaustion of the ammonia. When all ammonia has been released in this manner from the water and peat mixtures, the cocks $n$ and $o$ are closed, while the cocks $m$ are opened. The reservoir $c$ is then heated, inasmuch as the temperature of the outside air requires this, and the reservoir $b$ is cooled. As a result when the air-pump is operated there is a rapid circulation in the direction of the dotted arrows. When the desired density of the solution in the vessels $a$ and $p$ has reached a sufficient degree to be measured by the insertion of an aerometer, the weighted doors of such vessels are opened, and the contents are emptied after being freed of ammonia, as described.

The discharged material may be dried and spread on the soil in powdered form and used alone or in mixture with other manure.

Among the advantages due to employing my process I may mention the fact that no ammonia-gas is lost, but that a single supply of such gas may be reutilized as often as desired, forasmuch as it is not in combination with the humic acid of the peat.

If desired, the process may be carried out without employing a body of water separate from the ammonia solution. In such event the ammonia-gas may be pumped through the mixture of ground peat and water, and when the latter is fully saturated with ammonia or all of the ammonia is removed from the ammonia solution the mixture of peat and water is subjected to a suction or agitation to remove the ammonia and return it to the ammonia solution. Heat may be availed of to facilitate such exhaustion.

What I claim is—

1. The process for production of manure from peat, consisting in mixing ground peat with water, and circulating ammonia-gas through such mixture.

2. The process for production of manure from peat, consisting in mixing ground peat with water, circulating ammonia-gas through such mixture, and then circulating air through the mixture to drive off the ammonia.

3. The process for production of manure from peat, consisting in mixing ground peat with water, mixing ammonia-gas therewith, and subjecting the mass to suction to recover the ammonia.

In testimony whereof I have signed my name to this specification in the presence of two subscribing witnesses.

CORNELIS HENDRIK JOHAN VAN HAEFTEN.

Witnesses:
 I. I. HELSDON RIX,
 W. MARKOE.